H. BARRY & A. HINDGLASS.
GATE VALVE.
APPLICATION FILED DEC. 3, 1914.
1,172,924. Patented Feb. 22, 1916.
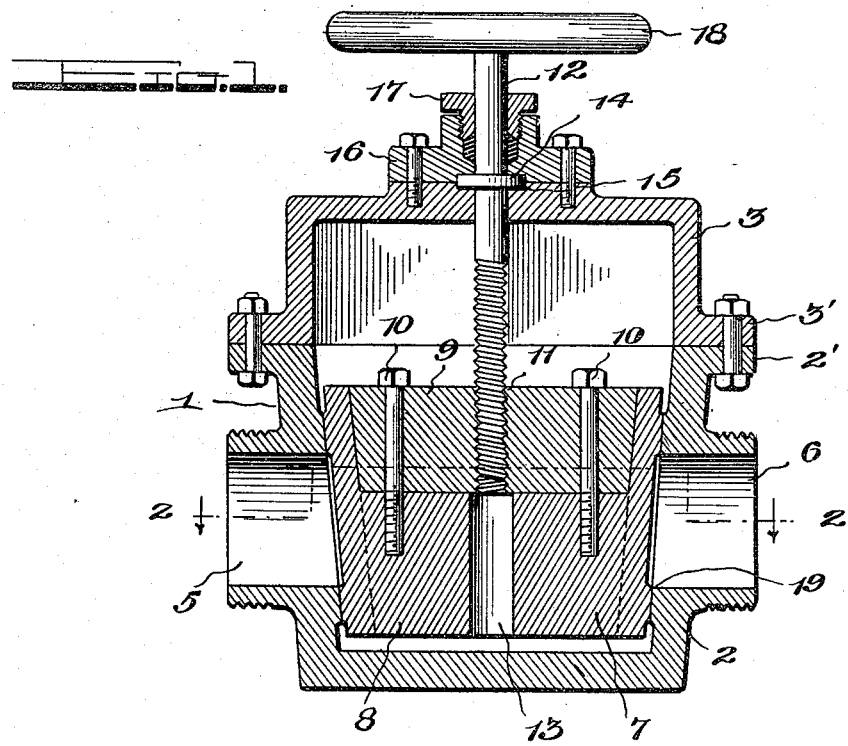
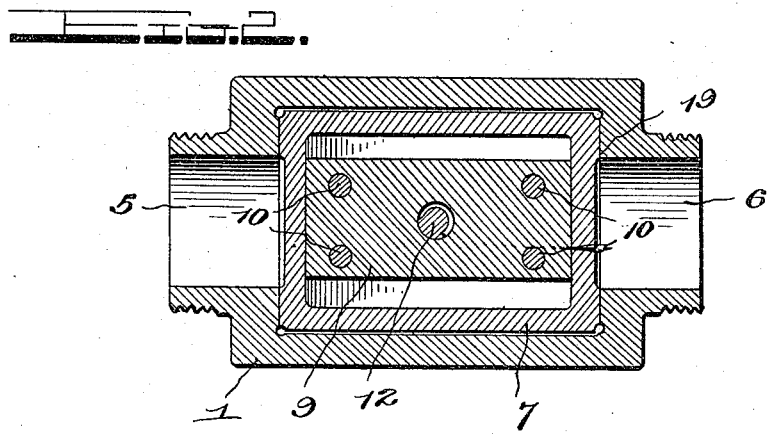
Witnesses
Inventors
H. Barry and
A. Hindglass,
By
Attorneys

UNITED STATES PATENT OFFICE.

HERBERT BARRY AND ALLEN HINDGLASS, OF HUNTSVILLE, TEXAS, ASSIGNORS OF ONE-FOURTH TO BEVERLY WOOD, OF HUNTSVILLE, TEXAS, AND ONE-FOURTH TO WILTON HALL, OF HERREID, SOUTH DAKOTA.

GATE-VALVE.

1,172,924. Specification of Letters Patent. Patented Feb. 22, 1916.

Application filed December 3, 1914. Serial No. 875,294.

*To all whom it may concern:*

Be it known that we, HERBERT BARRY and ALLEN HINDGLASS, citizens of the United States, residing at Huntsville, in the county of Walker and State of Texas, have invented certain new and useful Improvements in Gate-Valves; and we do declare the following to be a full, clear, and exact description of the invention, such as will enable others skilled in the art to which it appertains to make and use the same.

This invention relates to improvements in valves and more particularly to what are commonly known as gate valves which are especially designed for use on oil and other reservoirs containing valuable contents.

The object of the invention is to provide a valve of this character with a detachable lifting or opening device to adapt the valve to be repaired when necessary without removing it from its casing or emptying the tank to which it is applied.

With this and other objects in view, the invention consists of certain novel features of construction, and the combination and arrangement of parts as will be more fully described and claimed.

In the accompanying drawings: Figure 1 represents a longitudinal vertical section of a valve constructed in accordance with this invention; Fig. 2 represents a horizontal section thereof taken on the line 2—2 of Fig. 1.

In the embodiment illustrated, a suitable casting or casing 1 is shown comprising a lower member 2 and an upper member 3 detachably connected, each being here shown provided with laterally extending flanges 2' and 3' respectively, through which clamping bolts 4 are inserted for securing the members together. This casing as here shown, is substantially rectangular in configuration and the lower member 2 has oppositely disposed ports 5 and 6 here shown surrounded by threaded nipples to connect the casing by suitable coupling members (not shown) to a reservoir or other receptacle. The end walls of the lower member 2 preferably taper or converge toward their lower ends as is shown in Fig. 1 to provide for the tight or close seating of the gate 7 which is also shown with its end walls inclined downwardly and inwardly to provide a wedgelike member for insertion in the seat formed by the lower casing member 2. This valve or gate 7 is here shown constructed of two members 8 and 9 detachably connected by screws or bolts 10, the main or body member of the valve being shown recessed in its upper face to receive the detachable lifting member 9 which is preferably constructed of metal and has a threaded bore 11 extending centrally therethrough which is designed to receive the stem 12 of the valve, said stem being also threaded for detachable connection with said lifting member. The bore 11 in the lifting member 9 registers with a corresponding bore 13 formed in the valve body 8, said bore 13 being greater in diameter than the bore 11 to permit the threaded end of the stem 12 to move freely therein, the recess forming the seat in the valve body being unobstructed to permit the free vertical movement of the lifting member to facilitate its insertion and removal.

The valve stem 12 extends through the top of the upper casing member 3 which constitutes a hood for the casing and into which the valve is adapted to be lifted for opening the ports 5 and 6, said hood and the upper portion of the casing member 2 being sufficiently deep to completely house the valve body and its lifting member 9 when the valve is opened to its full extent. This stem 12 as here shown, is provided near its outer or upper end with a laterally extending flange 14 which is adapted to fit in a seat 15 formed by recessing the upper face of the top of the hood 3 and the lower face of a cap 16 which is detachably mounted on said hood around said stem to provide a swiveled connection of said stem whereby it may be freely rotated in said upper casing member and held against vertical movement so that the turning of said stem will cause the valve to raise or lower on said stem within said casing, the opening in said cap through which said stem passes being preferably provided with a bushing 17 to insure its fluid tight connection with the valve casing. An operating handle, here shown in the form of a wheel 18, is secured to the outer or upper end of the stem 12 and is designed for turning said stem to raise and lower the valve in the casing and for disconnecting it from the lifter when desired.

The valve 7 as shown, corresponds in shape to the interior of the casing 1 and the lifting member 9 thereof, is shown seated in its recessed upper face with spaces provided on opposite sides of said member 9 although, it is obvious that this member may completely fill the recess in the valve body if desired. The combined weight of the valve and its lifting member is such as to insure the seating of the valve should the stem 12 break or become disconnected from the valve. To insure the proper seating of this valve and prevent the formation of an air pocket at the bottom of the casing, the bottom of the valve is shown spaced from the bottom of the casing at least one-half inch more or less so that when the gate or valve is closed, it rests entirely on the valve seat 19 to insure tight fitting when the valve is closed and to provide for the gradual wearing away of the seat. By so arranging the valve, the closing thereof will not be interfered with should any sediment lodge in the casing.

The stem 12 is provided with a left hand thread to provide for the opening of the valve by turning the stem to the left and to close by turning it to the right but this formation of the thread may be reversed if found desirable.

This improved valve is especially designed for use on large oil storage tanks to eliminate the necessity of using an extra or emergency valve which is now found necessary to avoid loss in the contents of the tank or reservoir should breakage of the valve occur. In valves of this character, when the stem is broken or the threads in the gate stripped which occurs quite often in ordinary gates of this character, it necessitates the removal of the gate for repairing or replacing thereof and unless an emergency gate is provided, the tank must be emptied until the valve is repaired. It is to overcome these objectionable features, that applicants' gate is designed and by providing the detachable lifting member 9, should the stem break or the threads be stripped, all that is necessary is to remove the cap 16, detach the stem 12 from the lifting member 9 and by removing the screws 10 take out the lifting member and substitute a new one, should the threads thereof be defective. In case of the breakage of the stem, the broken portion will be removed from the lifter and a new stem substituted and this may be done without removing the gate itself which will drop automatically into place and will remain closed until the above repairs have been made and thus obviate the necessity of emptying the tank or providing extra valves. Moreover, the peculiar construction of this valve adapts it to be made very cheaply because of the small amount of machine work necessary for assembling the valve after it has been cast in the foundry and because access may be readily had to all machine parts.

We claim as our invention:

1. The combination of a valve casing comprising an upper and a lower member having laterally extending apertured flanges for detachable connection, said casing being substantially rectangular in configuration, the lower member having oppositely disposed ports arranged below its connection with the upper member, the end walls of said lower member inclining downwardly and inwardly, a gate valve mounted in said casing and comprising a body portion and a lifting member, the body portion having inclined ends to fit snugly the ends of said lower member and provided with a recess in the upper face to receive said lifting member, means detachably connecting said lifting and body members, said members having registering bores extending transversely therethrough, the bore of the lifting member being threaded and smaller than the bore of the body member, a valve stem having threaded engagement with the bore of the lifting member and adapted to pass freely into the bore of the body member, said stem extending through the upper casing member and rotatable therein and held against vertical movement.

2. The combination of a casing comprising an upper and a lower member detachably connected, the lower member having oppositely disposed ports arranged below its connection with the upper member, a gate valve mounted in said casing comprising a body portion and a lifting member, the body portion being provided with a recess in its upper face forming a seat to receive said lifting member, said seat being unobstructed to permit the free vertical movement of said lifting member to facilitate its insertion and removal without disturbing the body portion of the valve, bolts extending through said lifting member and engaging said body member, said lifting member being of less width than said seat to facilitate the removal and insertion of the lifting member, and a valve stem rotatable in said upper member and having threaded engagement with said lifting member.

In testimony whereof we have hereunto set our hands in presence of two subscribing witnesses.

HERBERT BARRY.
ALLEN HINDGLASS.

Witnesses:
W. D. BURKE,
W. O. MURRAY.

Copies of this patent may be obtained for five cents each, by addressing the "Commissioner of Patents, Washington, D. C."